United States Patent
Kriltz et al.

(10) Patent No.: US 7,718,266 B2
(45) Date of Patent: May 18, 2010

(54) FIRE-RESISTING GLASS

(75) Inventors: Uwe Kriltz, Thalheim (DE); Gunther Hellhammer, Thalheim (DE); Gert Beilicke, Leipzig (DE)

(73) Assignee: Guardian Flachglas GmbH, Thalheim (DE)

( * ) Notice: Subject to any disclaimer, the term of this patent is extended or adjusted under 35 U.S.C. 154(b) by 523 days.

(21) Appl. No.: 10/494,573

(22) PCT Filed: Nov. 5, 2002

(86) PCT No.: PCT/EP02/12345

§ 371 (c)(1),
(2), (4) Date: Sep. 9, 2004

(87) PCT Pub. No.: WO03/039857

PCT Pub. Date: May 15, 2003

(65) Prior Publication Data

US 2005/0008796 A1    Jan. 13, 2005

(30) Foreign Application Priority Data

Nov. 9, 2001    (DE) ................. 101 55 273

(51) Int. Cl.
*B32B 15/04* (2006.01)
*B32B 17/10* (2006.01)
(52) U.S. Cl. ............... 428/426; 428/34; 428/701; 428/702; 428/704; 428/432; 428/433; 428/434
(58) Field of Classification Search ........... 428/34, 428/426
See application file for complete search history.

(56) References Cited

U.S. PATENT DOCUMENTS

| 3,341,399 | A | * | 9/1967 | Hazdra et al. | ............... 428/429 |
| 3,457,138 | A | * | 7/1969 | Miller | ............... 428/34 |
| 3,537,944 | A | * | 11/1970 | Berning et al. | ............... 428/34 |
| 3,974,316 | A | * | 8/1976 | Jacquemin et al. | ............... 428/215 |
| 4,069,630 | A | * | 1/1978 | Chess et al. | ............... 52/172 |
| 4,173,668 | A |   | 11/1979 | Hentzelt et al. | |
| 5,154,953 | A | * | 10/1992 | de Moncuit et al. | ............... 428/34 |
| 5,264,286 | A | * | 11/1993 | Ando et al. | ............... 428/432 |

(Continued)

FOREIGN PATENT DOCUMENTS

| DE | 43 31 263 A | 3/1995 |
| EP | 0 379 337 | 7/1990 |
| EP | 0 999 192 A | 5/2000 |
| EP | 1 088 651 A | 4/2001 |
| GB | 2 286 008 A | 8/1995 |

*Primary Examiner*—Aaron Austin
(74) *Attorney, Agent, or Firm*—Nixon & Vanderhye P.C.

(57) ABSTRACT

There is provided a fire-resisting glass including a first laminated glass pane made of two float-glass panes connected via an intermediate organic layer, a second laminated glass pane made of two float-glass panes connected via an intermediate organic layer, an airtight clearance between the two laminated glass panes which is evacuated or filled with a gas, wherein a thermal insulation layer is provided on at least one of the sides of the float-glass panes facing the intermediate organic layer or the clearance. The thermal insulation layer may be provided on the two sides of the laminated glass panes facing the clearance.

10 Claims, 1 Drawing Sheet

U.S. PATENT DOCUMENTS

Figure 1:
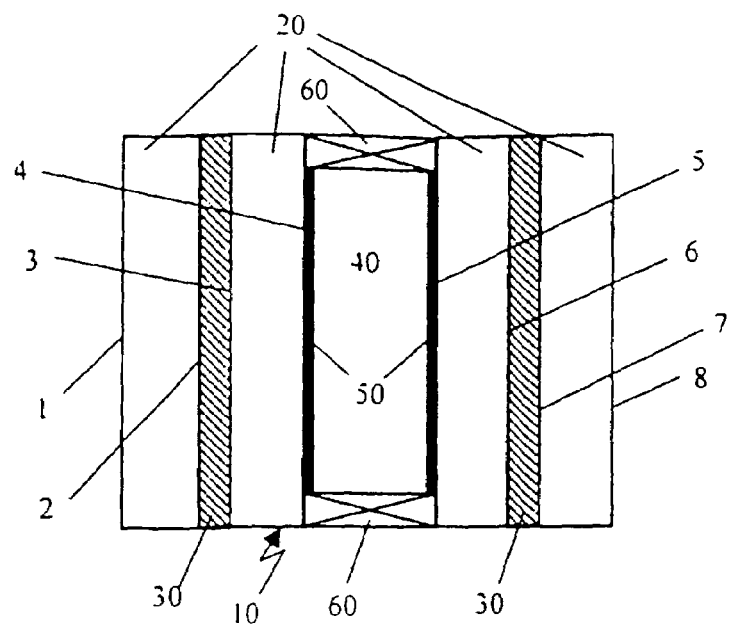

| | | | |
|---|---|---|---|
| 5,547,720 A * | 8/1996 | Rittler | 428/34 |
| 5,834,103 A * | 11/1998 | Bond et al. | 428/216 |
| 6,030,671 A * | 2/2000 | Yang et al. | 428/34 |
| 6,055,088 A | 4/2000 | Lin et al. | |
| 6,180,247 B1 * | 1/2001 | Szczyrbowski et al. | 428/432 |
| 2006/0188730 A1 * | 8/2006 | Varanasi et al. | 428/432 |

* cited by examiner

FIRE-RESISTING GLASS

This application is the US national phase of international application PCT/EP02/12345 filed in English on 5 Nov. 2002, which designated the US. PCT/EP02/12345 claims priority to DE Application No. 101 55 273.4 filed 9 Nov. 2001. The entire contents of these applications are incorporated herein by reference.

1. TECHNICAL FIELD

The present invention relates to a fire-resisting glass. Fire-resisting glasses are classified in accordance with their behavior under fire conditions: in the fire test as per DIN 4102, fire-resisting glasses of the fire-resistance classes F (so-called F-glazing) have to securely prevent flames and smoke from extending as well as heat radiation from penetrating. Fire-resisting glasses of the fire-protection classes G (G-glazing) merely have to prevent flames and smoke from extending. The penetration of heat radiation is only to be impaired. The duration in minutes for which a fire-resisting glass fulfills these requirements in the event of a fire determines its fire-protection class (e.g. G30, G60, F30, F60 etc.). In the description of the present invention the term fire-resisting glass is exclusively used for glasses fulfilling at least the requirements of one fire-protection class.

2. PRIOR ART

Various concepts for the construction of a fire-resisting glass are known from the prior art. For example, wired glasses are used wherein a wire braid reinforcement is incorporated into the glass. Another concept are sandwich constructions made of two or more panes of common float glass wherein one or more gel-like inter-mediate layers are provided, typically made of a water-containing alkali silicate. These intermediate layers foam with increasing temperature and become opaque. Together with the float glass panes, already cracked due to the heat, this comparatively strong foam can maintain its room-closing effect in the case of a fire. An example for such a fire-resisting glass with a total of three panes is disclosed in DE 199 16 506.

In order to improve the mechanical properties of such a fire-resisting glass, it is moreover known to use laminated glass panes instead of simple float glass panes enclosing the fire-hindering alkali silicate layer, wherein each of these panes consists of two float-glass panes, connected by means of a plastic foil.

Another concept is disclosed in the EP 1 088 651. Here, a resin layer is provided between the two glass panes, darkening when the temperature increases, and thus preventing heat radiation from penetrating. Moreover, an IR reflection layer is provided on at least one of the two glass panes.

Another fire-resisting glass is known from GB 2 289 496. A ceramic glass pane with a very high melting point is provided between two common float glass panes in order to achieve the necessary mechanical stability.

Finally, it is known to improve the endurance of glasses under fire conditions by means of using special materials, e.g. boron silicates, for the glass instead of the common float glass made of soda-lime silica glass; these materials have lower thermal coefficients of expansion and higher melting points. Alternatively, the glass is pre-stressed in order to achieve a higher breaking resistance. A fire-resisting glass of this type is for example disclosed in EP 0 608 457.

All mentioned fire-resisting glasses from prior art have, however, the disadvantage of substantially higher production costs than panes made out of common float glass. Moreover, they can only be processed with higher expense, thus increasing the cost for production of windows or doors made of these glasses. This is particularly true for pre-stressed glasses. Moreover, the mechanical properties of many fire-resisting glasses, e.g. binding of splinters and the capability not to collapse even if cracks are present are as bad as the thermal insulating properties. Therefore, the present invention is based on the problem to provide a low-cost fire-resisting glass, combining good mechanical and thermal properties and low production cost.

3. SUMMARY OF THE INVENTION

With regard to a first aspect, the present invention relates to a fire-resisting glass with a first laminated glass pane made of two float glass panes connected by means of an intermediate organic layer, a second laminated glass pane made of two float-glass panes connected by means of an intermediate organic layer, an airtight clearance between the two laminated panes, which is evacuated or filled with a gas, wherein a thermal insulation layer is provided on at least one of the float-glass pane's sides facing the intermediate organic layer or the clearance. Preferably, the thermal insulating layer is provided on both sides of the laminated glass panes, facing the clearance.

The invention is based on the surprising realization that the combination of a known insulating glass made of two laminated glass panes having alone not sufficient fire-resisting properties with a thermal insulation layer being sufficiently effective also at high temperatures leads to a glass which can be used as fire-resisting glass, since it at least fulfills the requirements of low fire-protection classes. In the fire test, the endurance amounted to clearly more than 30 minutes. Contrary to the fire-resisting glasses of the prior art explained above, such a glass can be produced and processed at considerably lower cost. Moreover, the fire-resisting glass as per the invention has clearly better mechanical and thermal properties.

According to a further aspect of the present invention, the present invention relates to a fire-resisting glass with a first and a second float-glass pane, wherein the first and the second float-glass pane adhere to an intermediate organic layer provided between them, wherein a thermal insulating layer is provided on the side of the first and/or the second float-glass pane facing the intermediate organic layer, and wherein a pyrolitic layer is provided on the side of the first and/or second float-glass pane opposite the intermediate organic layer.

Thus, even a known laminated glass pane can be used as fire-resisting glass within the meaning of the above definition as long as the thermal insulation properties are sufficiently improved by the two mentioned layers.

The pyrolitic layer preferably comprises fluorine (F) doped tin oxide ($SnO_2$) while the thermal insulating layer is preferably a silver (Ag) based layer with an emissivity of <0.1, in particular 0.04. A thermal insulating layer comprising a series of layers $SnO_2$, Ag, $SnO_2$, SiN, starting from the glass surface, is particularly preferred.

Further improvements of the fire-resisting glasses as per the invention are the subject matter of further dependent claims.

4. BRIEF DESCRIPTION OF THE DRAWINGS

Figure 2:
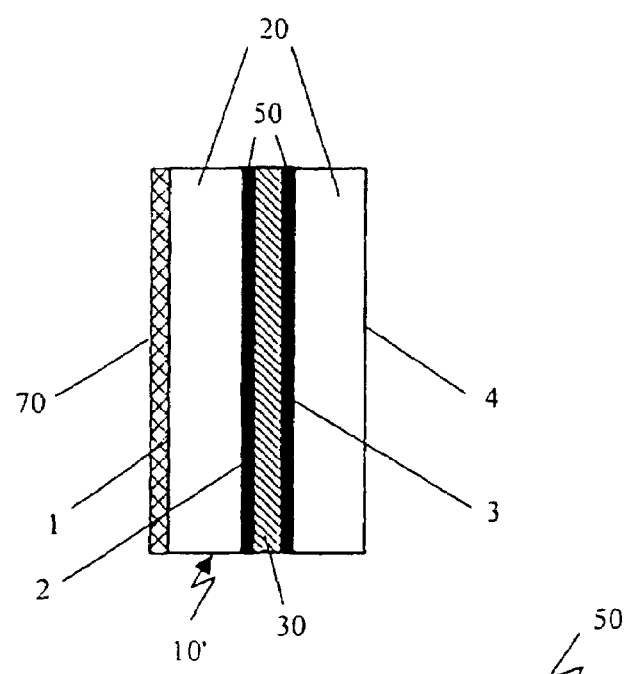
Figure 3:
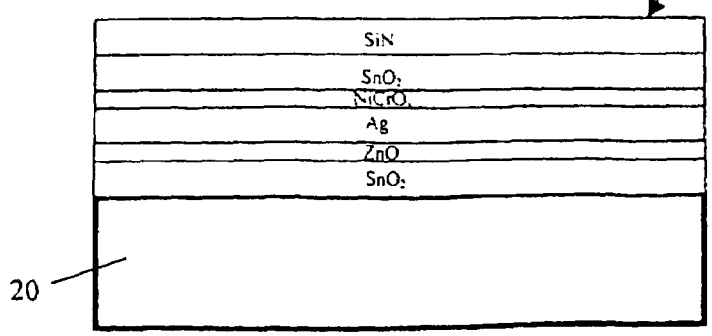

Presently preferred embodiments are described in the following detailed description, referring to the drawings and showing:

FIG. 1: a section through a fire-resisting glass according to a first embodiment of the present invention;

FIG. 2: a section through a fire-resisting glass according to a second embodiment of the present invention;

FIG. 3: a schematic view of the stack of a preferred thermal insulation layer for the fire-resisting glasses as per FIGS. 1 and 2.

5. DETAILED DESCRIPTION OF PREFERRED EMBODIMENTS

FIG. 1 shows a first preferred embodiment of the present invention in a schematically simplified vertical section through a fire-resisting glass 10. The thicknesses of the individual panes 20, the intermediate organic layers 30, or layers 50 are not to scale. This is also true for the subsequent FIGS. 2 and 3.

As can be perceived, two laminated glass panes are provided at the right and left hand side of a clearance 40, each of them comprising glass panes 20 connected by means of an intermediate organic layer provided as a foil 30. The panes 20 are non-treated float-glass, i.e. float glass, which can be produced at low-cost and out of soda-lime silica glass in the float method.

The foil 30 is made of a thin plastic materials—as common with laminated glass—, for example of a plasticized polymer based on polyvinylbutyral, and assures that splinters of the panes 20 are bound and that the capability of a splintered pane not to collapse is increased. Besides plastic materials based on PVB, other materials can be used for the fire-resisting glass, in particular if they have higher thermal resistance (e.g. EVA, cast resins, teflon).

The clearance 40 between the two laminated glass panes is defined by spacing elements 60, either made of heat-resistant plastic materials or of metals. Typical dimensions of the fire-resisting glass as per the invention are four glass panes 20 of 4 mm thickness, two PVB foils 30 of 0.76 mm thickness, and a clearance 40 of 16 mm thickness. Although FIG. 1 shows a fire-resisting glass consisting of only two laminated glass panes, it is also possible to provide more than two laminated glass panes with a corresponding plurality of clearances 40, for example if the requirements of higher fire-protection classes are to be fulfilled.

In order to avoid condensation of air moisture or even corrosion of the thermal insulation layers 50 described below, the clearance 40 is evacuated or filled with a gas such as argon. The seals for the clearance 40 (not shown in FIG. 1) are preferably made of a heat-resistant silicone. On the whole, a fire-resisting glass 10 is thus provided at low costs, having good usage properties in addition to fire protection. For example, the sound insulation of the described construction amounts to approx. 42 dB and is thus clearly above the values for known fire-resisting glasses.

The four glass panes 20 of the exemplary fire-resisting glass 10 shown in FIG. 1 have a total of eight surfaces 1-8. A thermal insulating layer 50 with a very low emissivity is preferably provided on the surfaces 4 and 5. Preferred values are below 0.1. An emissivity under 0.04 is particularly preferred. The thermal insulation layer of this emissivity is based on a silver layer surrounded by dielectric materials.

The preferred stack of the thermal insulation layer is schematically shown in FIG. 3: A $SnO_2$ layer of approx. 35 nm thickness is provided directly on the float-glass pane 20. Approx. 4 nm ZnO are provided on top of it, followed by an Ag layer of approx. 12 nm thickness. An intermediate $NiCrO_x$, (x=0 . . . 2) layer of approx. 1 nm thickness is followed by a further $SnO_2$ layer of about 30 nm. This preferred stack is concluded by a SiN layer of about 20 nm thickness. SiN can alternatively be used instead of the upper $SnO_2$ layer.

The layers described are preferably deposited on the float-glass panes by means of a PVD method (physical vapor deposition), such as sputter deposition.

Surprisingly, the fire test as per DIN 4102 showed for the above-explained fire-resisting glass that this construction, i.e. a laminated insulating glass with thermal insulation layer without a special layer of water-containing alkali silicate or the like, and without using special pre-stressed glasses, fulfills at least the requirements of the fire-protection class G 30. The following observations have been made:

At first, the outer pane 20, facing the fire, breaks. Due to its capacity not to collapse even in the broken state, the outer laminated glass pane, however, does not fall apart for the time being. Thus, both thermal protection layers 50 can prevent excessive heating of the inner laminated glass pane during this period. Therefore, temperatures of merely 40° C. are measured on the outer surface of the laminated glass pane opposite to the fire during the initial phase of the fire test. The second laminated glass pane does not show damages until after 18 min. before it finally collapses after clearly more than 30 minutes so that flames and smoke can penetrate.

Additional thermal insulation layers on the surfaces 1, 2, 3, 6, 7, 8 of the panes 20 can further increase the endurance of the fire-resisting glass 10 in the discussed fire test. A pyrolitic layer made of doped tin oxide ($SnO_2$) is preferably used for the surfaces 1 and 8 facing the outside, preferably deposited on the corresponding float-glass pane 20 by means of a CVD process (Chemical vapor deposition).

FIG. 2 shows an even simpler construction of a fire-resisting glass 10', which can also fulfill the requirements of the lowest fire-protection class G 30. Here, a known laminated glass made of two panes 20 and a connecting plastic foil 30 is modified by means of one or more thermal insulation layers 50 on the sides 2 and 3, facing the foil. Endurance of the second float-glass pane 20 is significantly increased in this embodiment by means of the large radiation shielding of the thermal insulation layers 50. For this embodiment, too, the preferred composition of the thermal insulation layer 50 is the stack shown in FIG. 3.

Additionally, a pyrolitic layer 70 is provided on the side facing the fire in order to postpone premature heating of the foil 30 and of the pane 20, opposing the fire. Such a pyrolitic layer 70 can also be provided on the other outer surface 4, if the fire-resisting glass is used symmetrically, expecting fire from both sides.

The invention claimed is:

1. Fire-resisting glass fulfilling at least the requirements of fire-protection class G30 and consisting essentially of:
   a. a first laminated glass pane comprising two float-glass panes connected by means of an intermediate organic layer;
   b. a second laminated glass pane of the fire-resisting glass comprising two float-glass panes connected by means of an intermediate organic layer;
   c. an airtight clearance between the two laminated glass panes being evacuated and/or filled with a gas, and
   d. a thermal insulation layer comprising an infrared (IR) reflecting metal layer is provided on at least one of the sides of the float-glass panes, facing the intermediate organic layers, and wherein the fire-resistant glass fulfills at least the requirements of fire-protection class G30.

2. Fire-resisting glass in accordance with claim 1, wherein a pyrolitic layer is additionally provided on at least one of the sides of the first and/or second laminated glass-pane, facing towards the outside.

3. Fire-resisting glass in accordance with claim 2, wherein the pyrolitic layer contains fluorine doped tin oxide.

4. Fire-resisting glass in accordance with claim 1, wherein the thermal insulation layer is a layer based on silver, having an emissivity of <0.1.

5. Fire-resisting glass in accordance with claim 4, wherein the thermal insulation layer comprises a series of layers $SnO_2$ Ag, $SnO_2$, SiN, seen from the glass surface.

6. Fire-resisting glass in accordance with claim 4, wherein the thermal insulation layer comprises respective layers comprising, from the glass substrate outwardly, tin oxide, silver, silicon nitride, silicon nitride.

7. Fire-resisting glass in accordance with claim 4 wherein a ZnO layer is additionally provided below the silver layer, and wherein a $NiCrO_x$ layer is provided on top of the silver layer.

8. Fire-resisting glass in accordance with claim 1, wherein the thermal insulation layer comprises the following layers, from the glass surface outwardly: 35 nm $SnO_2$, 4 nm ZnO, 12 nm Ag, 1 nm $NiCrO_x$, 30 nm $SnO_2$ 20 nm SiN.

9. Fire-resisting glass in accordance with claim 1, wherein the thermal insulation layer is a layer based on silver, having an emissivity of <0.04.

10. Fire-resisting glass in accordance with claim 1, wherein the thermal insulation layer is a low-E coating comprising a layer comprising silver.

* * * * *